United States Patent [19]
Calvert et al.

[11] Patent Number: 6,050,055
[45] Date of Patent: Apr. 18, 2000

[54] APPARATUS AND METHOD FOR SEALING OF PAPERBOARD CONTAINERS USING INDUCTION HEATED METAL BANDS

[75] Inventors: Barry Gene Calvert, Covington; Richard Eric Nordgren, Daleville, both of Va.

[73] Assignee: Westvaco Corporation, New York, N.Y.

[21] Appl. No.: 09/138,271

[22] Filed: Aug. 21, 1998

[51] Int. Cl.[7] .................................................. B65B 51/18
[52] U.S. Cl. .......................... 53/300; 53/329.3; 53/329.4
[58] Field of Search ........................... 53/478, 485, 300, 53/329.2, 329.3, 329.4, 329.5, 374.4, 374.6, 387.3; 277/628, 630, 650, 919

[56] References Cited

U.S. PATENT DOCUMENTS

| | | | |
|---|---|---|---|
| 1,109,259 | 7/1914 | Sons et al. | 53/387.3 |
| 2,800,162 | 6/1957 | Rohdin | 53/387.3 |
| 2,987,107 | 6/1961 | Sylvester et al. . | |
| 3,325,969 | 6/1967 | Bemiss et al. | 53/329.2 |
| 3,416,292 | 12/1968 | Weber . | |
| 3,436,894 | 4/1969 | Sorensen . | |
| 3,508,376 | 4/1970 | Bemiss | 53/478 |
| 4,006,575 | 2/1977 | Lee . | |
| 4,285,461 | 8/1981 | Meyers . | |
| 4,445,025 | 4/1984 | Metz | 53/387.3 |
| 4,637,199 | 1/1987 | Steck et al. . | |
| 4,691,500 | 9/1987 | Danforth et al. . | |
| 4,866,913 | 9/1989 | Rebischung | 53/478 |
| 5,117,613 | 6/1992 | Pfaffmann . | |
| 5,243,808 | 9/1993 | Landrum . | |
| 5,345,747 | 9/1994 | Raque et al. . | |
| 5,353,572 | 10/1994 | Shigeta | 53/387.3 |
| 5,419,096 | 5/1995 | Gorlich . | |
| 5,419,097 | 5/1995 | Gorlich et al. . | |
| 5,479,759 | 1/1996 | Gorlich et al. . | |
| 5,679,109 | 10/1997 | Gics . | |
| 5,713,069 | 1/1998 | Kato | 399/330 |
| 5,714,736 | 2/1998 | Yoneda et al. | 219/216 |
| 5,718,101 | 2/1998 | Noel et al. . | |

*Primary Examiner*—Linda Johnson
*Attorney, Agent, or Firm*—J. R. McDaniel; R. L. Schmalz

[57] ABSTRACT

Using induction heaters, two rotating metal bands are heated to a target temperature, continuously sensed by infrared temperature probes and then compressed on either side of a mated pair of paperboard carton flanges in an extended nip. The mated paperboard flange area is then heated by conduction from the metal bands to the activation temperature of the coating material to form a uniform bond between the paperboard surfaces.

8 Claims, 3 Drawing Sheets

APPARATUS AND METHOD FOR SEALING OF PAPERBOARD CONTAINERS USING INDUCTION HEATED METAL BANDS

BACKGROUND OF THE INVENTION

1. Field of the Invention

Using induction heaters, two rotating metal bands are heated to a target temperature, continuously sensed by infrared temperature probes and then compressed on either side of a mated pair of paperboard carton flanges in an extended nip. The mated paperboard flange area is then heated by conduction from the metal bands to the activation temperature of the coating material to form a uniform bond between the paperboard surfaces.

2. Description of the Related Art

It is known, in packaging apparatus, to employ various equipment for sealing film material to trays. Exemplary of such prior art are U.S. Pat. No. 3,436,894 ('894) to R. P. Sorensen, entitled "Packaging Apparatus and Method" and U.S. Pat. No. 3,416,292 ('292) to O. R. Weber, entitled "Apparatus for Making Covered Receptacles or The Like". While the '894 and '292 references disclose a continuous sealing method, the '894 reference relies on heating a contoured wheel or drum unit via conventional heating elements and the '292 reference discloses using belts which are heated via the conduction of heat from the carrier rollers. However, such broad applications of heat through the use of the belts or wheels/drum units can create a marring of the lid, which is unacceptable to the customer.

It is also known in the packaging of paperboard cartons to employ induction sealing. Exemplary of such prior art are U.S. Pat. No. 4,637,199 ('199) to R. F. Steck et al., entitled "Induction Sealing of Paperboard" and U.S. Pat. No. 5,117,613 ('613) to G. D. Pfaffmann, entitled "Induction Heating and Packaging Sealing System and Method". While the '199 and '613 references disclose induction heating, the material to be sealed must have a metallic layer to carry the current produced and heat the sealant layer. A more advantageous system, then, would be presented if such a metallic layer could be eliminated.

It is apparent from the above that there exists a need in the art for a paperboard carton system which is capable of sealing paperboard cartons while reducing the marring of the carton, but which at the same time substantially eliminates the need for any metallic layers in the paperboard carton.

It is a purpose of this invention to fulfill this and other needs in the art in a manner more apparent to the skilled artisan once given the following disclosure.

SUMMARY OF THE INVENTION

Generally speaking, this invention fulfills these needs by providing an induction heating apparatus for sealing paperboard cartons, comprising a plurality of rotatable carton translating/heating means, a driving means operatively connected to the rotatable carton translating/heating means, a plurality of plate means operatively attached to the driving means, an adjustable induction heating means located a predetermined distance from the rotatable carton translating/heating means, and an adjustment means operatively attached to the adjustable induction heating means.

In certain preferred embodiments, the rotatable carton translating/heating means are metal bands. Also, the driving means consist of various rollers and a nipped drive roll. Also, the adjustment means consists of pneumatic cylinders. Finally, a temperature sensor is used to control the temperature of the rotatable carton translating/heating means.

In another further preferred embodiment, the use of the induction heating apparatus provides a simultaneous application of heat and pressure to a mated pair of carton surfaces in order to insure a well bonded junction or seal.

The preferred heating/sealing apparatus, according to this invention, offers the following advantages: ease of assembly and repair; excellent heating characteristics; excellent sealing characteristics; excellent temperature control; good stability; good durability and excellent economy. In fact, in many of the preferred embodiments, these factors of heating, sealing, temperature control and economy are optimized to the extent that is considerably higher than heretofore achieved in prior, known heating/sealing apparatus.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Paperboard is used as a substrate for carton 150 (FIG. 3) and is, typically, constructed from a 0.018" thick bleached sulphate sheet, solid unbleached sulphate (SUS) or clay-coated newsback (CCNB). Definitively, the term paperboard describes paper within the thickness range of 0.008 to 0.028 inches. The invention is relevant to the full scope of such a range, as applied to packaging and beyond.

When used for food carton stock, the paperboard is usually clay coated on at least one side surface and occasionally on both sides. The paperboard trade characterizes a paperboard web or sheet that has been clay coated on one side as C1S and C2S for a web coated on both sides. Compositionally, the paperboard coating is a fluidized blend of minerals such as coating clay, calcium carbonate and/or titanium dioxide with starch or adhesive which is smoothly applied to the traveling surface. Successive densification and polishing by calendering finishes the mineral coated surface to a high degree of smoothness and superior graphic print surface.

When C1S paperboard is used for food packaging, the clay coated surface is prepared as the outside surface, i.e., the surface not in contact with the food. Pursuant to the present invention, the other side (the side in contact with the food) is coated with a conventional polymeric coating 104 (FIG. 2), e.g., a poly extruded or polyethylene terephthalate (PET)-type coating which exhibits excellent moisture vapor, oxygen and flavor barrier characteristics.

Figure 1:
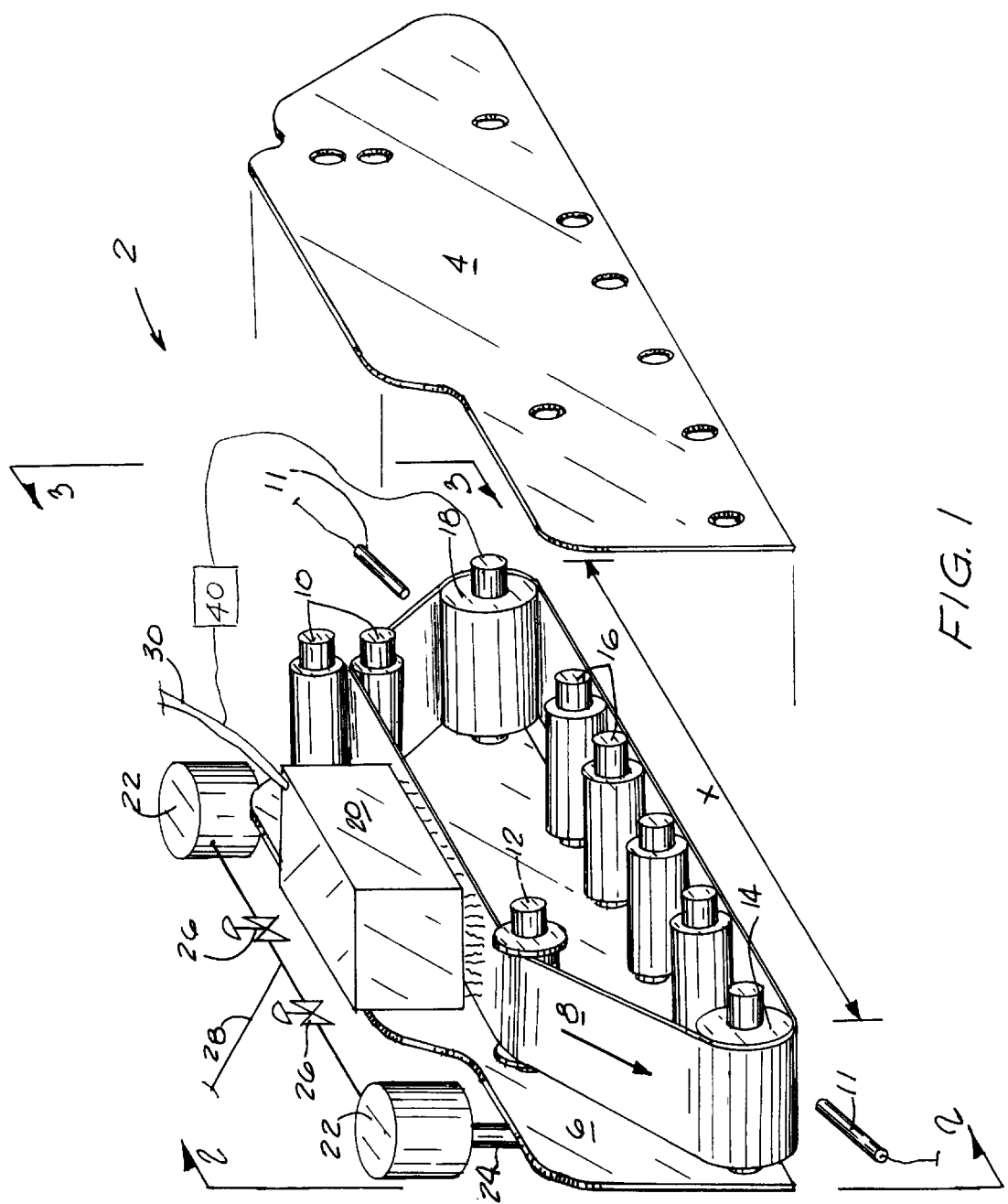
FIG. 1 is a isometric view of an induction heating apparatus for sealing paperboard cartons, according to the present invention.

With reference first to FIG. 1, there is illustrated an advantageous environment for use of the concepts of this invention. In particular, induction heating apparatus 2 for sealing paperboard carton 150 (FIG. 3) is illustrated. Apparatus 2 includes, in part, upper assembly 3, plates 4 and 6, band 8, nipped drive rollers 10, temperature sensors 11, conventional rollers 12, 14, 16 and 18, extended nip area X, induction heater 20, conventional pneumatic cylinders 22, shaft 24, conventional control valves 26, conventional pressurized air source 28 and conventional power source 30. It is to be understood that two induction heating setups are to be located across from each other along extended nipped area X, as shown in FIG. 2.

Plates 4 and 6, preferably, are constructed of any suitable, durable, metallic material. Band 8 is to be constructed of any suitable, durable, metallic material. Temperature sensors 11, preferably, can include any suitable temperature sensor, such as an infrared sensor.

Figure 2:
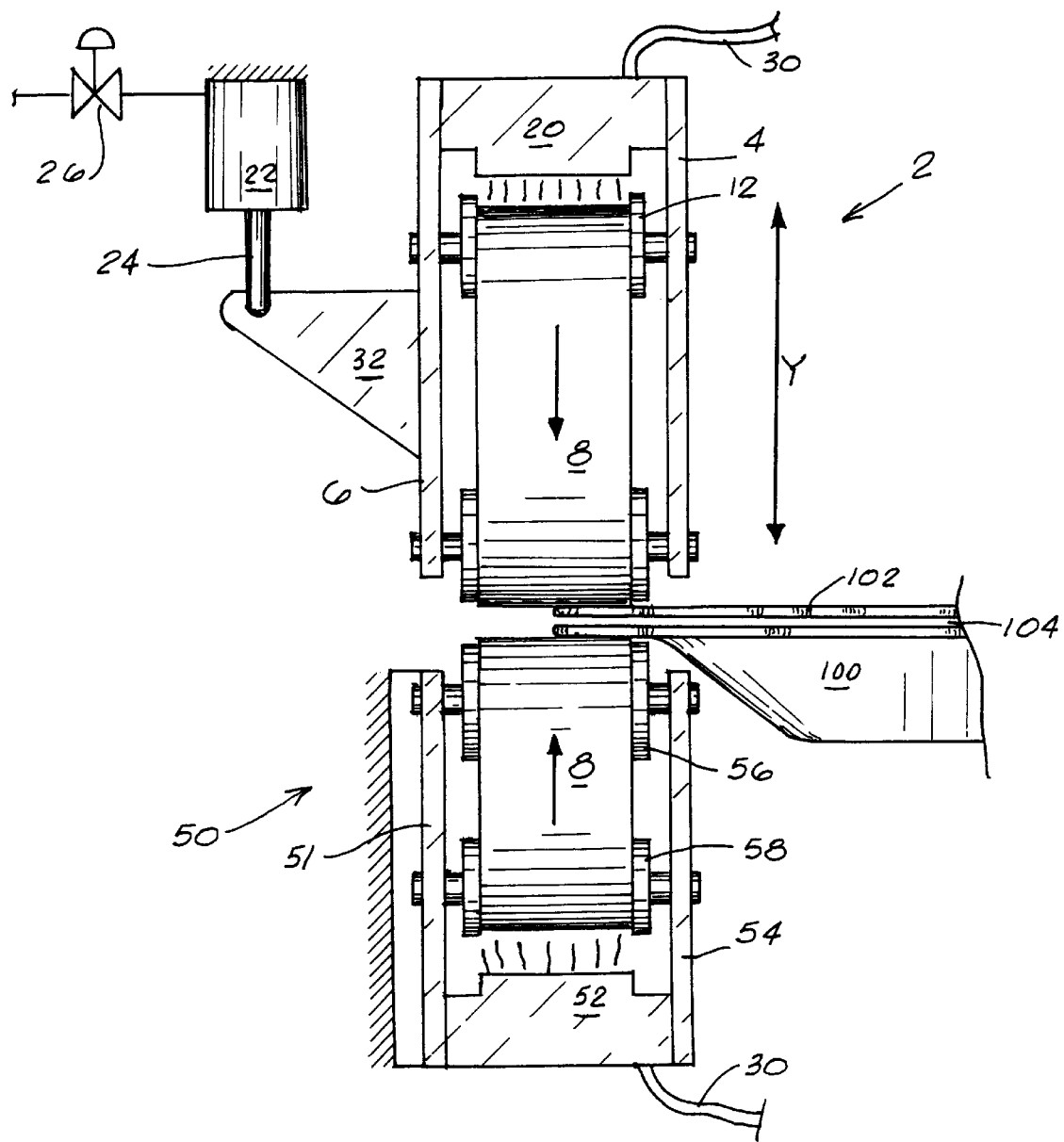
FIG. 2 is an infeed view, taken along line 2—2 of FIG. 1 of the induction heating apparatus, according to the present invention.

With respect to FIG. 2, there is illustrated a mechanism for raising and/or lowering induction heater 20 of upper assembly 3 along the direction of arrows Y. In particular, pneumatic cylinder 22 is conventionally pivotally attached to conventional arm 32. Arm 32 is rigidly attached to plate 6 by conventional techniques. The operation of pneumatic cylinder 20 pivots arm 32 which allows induction heater 20 to move along the direction of arrows Y.

Also, the fixed lower induction heating assembly 50 can be seen in FIG. 2. Assembly 50 includes, in part, belt 8, conventional power source 30, plate 51, conventional induction heater 52, plate 54 and conventional rollers 56 and 58. Plates 51 and 54, preferably, are constructed of any suitable, durable, metallic material. Rollers 56 and 58 are designed in the same fashion as rollers 12, 14, 16 and 18.

Finally, paperboard tray 100, lid 102 and polymeric coating 104 are shown. As discussed earlier, carton 101 and lid 102 are coated with a conventional polymeric material 104, which is heat activated to seal/bond tray 100 to lid 102.

Figure 3:
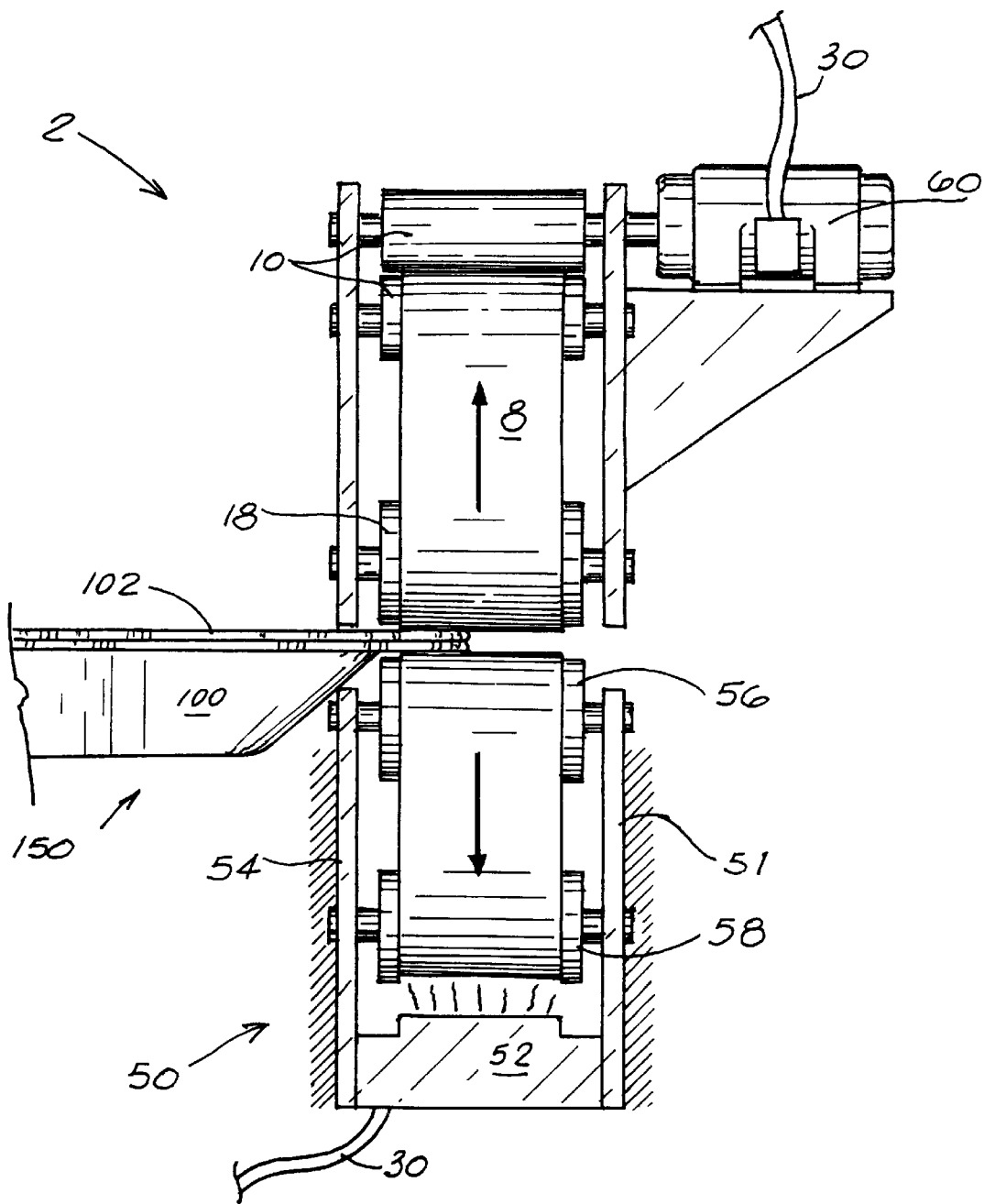
FIG. 3 is a delivery side view, taken along line 3—3 of FIG. 1 of the induction heating apparatus, according to the present invention.

FIG. 3 illustrates the delivery side view of induction heating apparatus 2. In this view, conventional drive motor 60 is shown. Motor 60 is conventionally attached to nipped rollers 10. Also, sealed/bonded paperboard carton 150 is shown after lid 102 has been sealed to tray 100.

During the operation of induction heating apparatus 2, two rotating metal bands 8 are heated by induction heaters 20 and 52. An extended nip area X is used to bond mated paperboard surfaces together. The bond is effected by the simultaneous application of heat and pressure between bands 8 for a significant dwell time, in order to heat paperboard coating 104 to its activation temperature.

The temperature of metal bands 8 is regulated by varying the power delivered to induction heaters 20 and 52. Power is varied in accordance to the temperature of bands 8 as sensed by the infrared temperature probes 11.

Pressure is applied to the mated paperboard surfaces of tray 100 and lid 102 by passing them in a series of nips while they are sandwiched between two rotating metal bands 8 of induction heating apparatus 2. The nip pressure is regulated by adjusting the air pressure delivered to the pneumatic cylinders 22 which control the proximity of the upper band/track assembly 3 to the lower band/track assembly 50.

Carton 150 is carried through the nip (X) by the action of rotating metal bands 8 which are driven by the variable speed electric drive motor 60 whose output rotates a set of nipped rolls 10 in contact with the metal bands 8 on the delivery side of the device (FIG. 3). A suitable controller 40 is used to regulate the speed of the operation of the device, as well as to control the temperatures of bands 8.

The induction heating apparatus 2 operates continuously in that the speed of belt 8 is matched to the speed of the production line (not shown), which fills tray 100 prior to sealing. Apparatus 2 is rotary in nature and does not suffer from mechanical problems associated with platen sealers which must operate in a cyclic manner on such production lines. Apparatus 2 makes use of conduction to heat coatings 104, which is a very rapid heating mechanism versus air convection or radiant energy absorption from micro-waves.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. An induction heating apparatus for sealing paperboard cartons, comprising of:

a plurality of rotatable carton translating and heating means;

a driving means operatively connected to said rotatable carton translating and heating means;

a plurality of plate means operatively attached to said driving means;

an adjustable induction heating means located a predetermined distance from said rotatable carton translating and heating means; and an adjustment means operatively attached to said adjustable induction heating means, wherein said adjustment means is further comprised of; an arm means rigidly attached to one of said plurality of plate means, a rod means pivotally attached to said arm means, a pneumatic cylinder means operatively attached to said rod means, and a pneumatic fluid delivery means operatively connected to said pneumatic cylinder means.

2. The apparatus, as in claim 1, wherein said rotatable carton translating and heating means is further comprised of:

bands.

3. The apparatus, as in claim 2, wherein said bands are further comprised of:

metallic bands.

4. The apparatus, as in claim 1, wherein said driving means is further comprised of:

a plurality of nipped drive roll means; and a plurality of rollers.

5. The apparatus, as in claim 4, wherein said plurality of nipped drive roll means is further comprised of:

a variable speed drive motor.

6. The apparatus, as in claim 1, wherein said apparatus is further comprised of:

a temperature sensor means located a predetermined distance away from said rotatable carton translating and heating means.

7. The apparatus, as in claim 6, wherein said temperature sensor means is further comprised of:

an infrared sensor.

8. The apparatus, as in claim 1, wherein said adjustable induction heating means is further comprised of:

a vertically adjustable section; and a fixed section located adjacent to said vertically adjustable section.

* * * * *